(No Model.) 3 Sheets—Sheet 1.
W. MUNDT.
SPOOL HOLDER FOR BRAIDING MACHINES.
No. 520,655. Patented May 29, 1894.

WITNESSES:
J. Nussblatt
K. R. Brennan

INVENTOR
W. Mundt
BY Goepel & Raegener
ATTORNEYS.

(No Model.) 3 Sheets—Sheet 2.
W. MUNDT.
SPOOL HOLDER FOR BRAIDING MACHINES.
No. 520,655. Patented May 29, 1894.
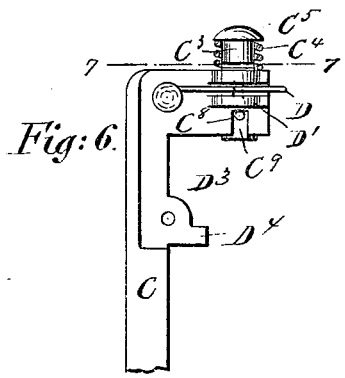
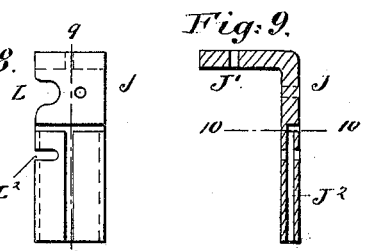
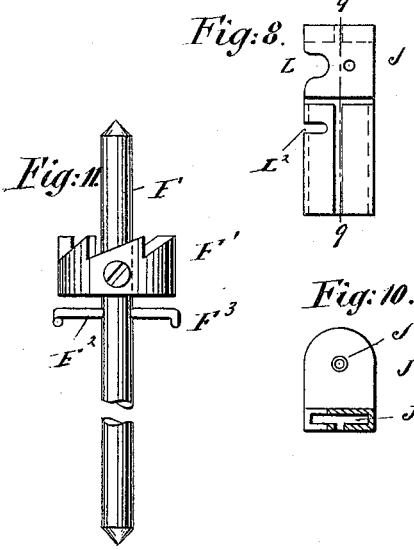
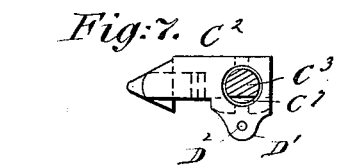
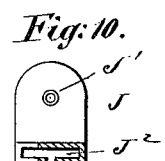
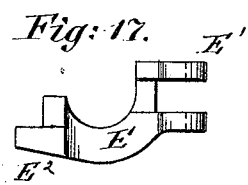
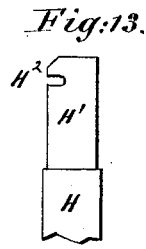
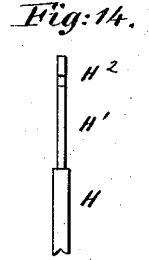
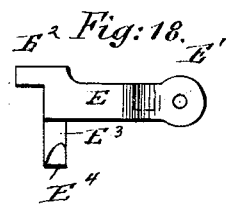
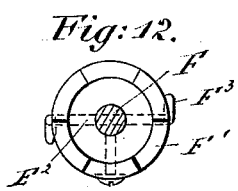
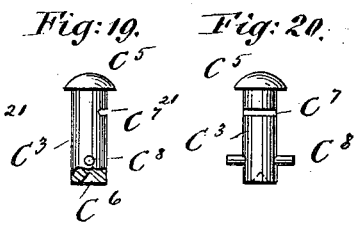
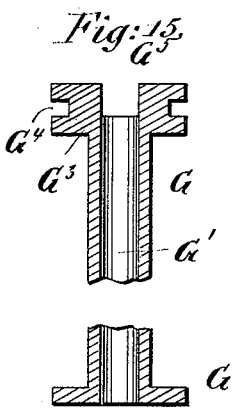
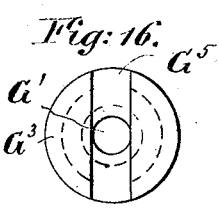
WITNESSES:
INVENTOR
W. Mundt
BY Goepel & Raegener
ATTORNEYS.

(No Model.) 3 Sheets—Sheet 3.
W. MUNDT.
SPOOL HOLDER FOR BRAIDING MACHINES.
No. 520,655. Patented May 29, 1894.
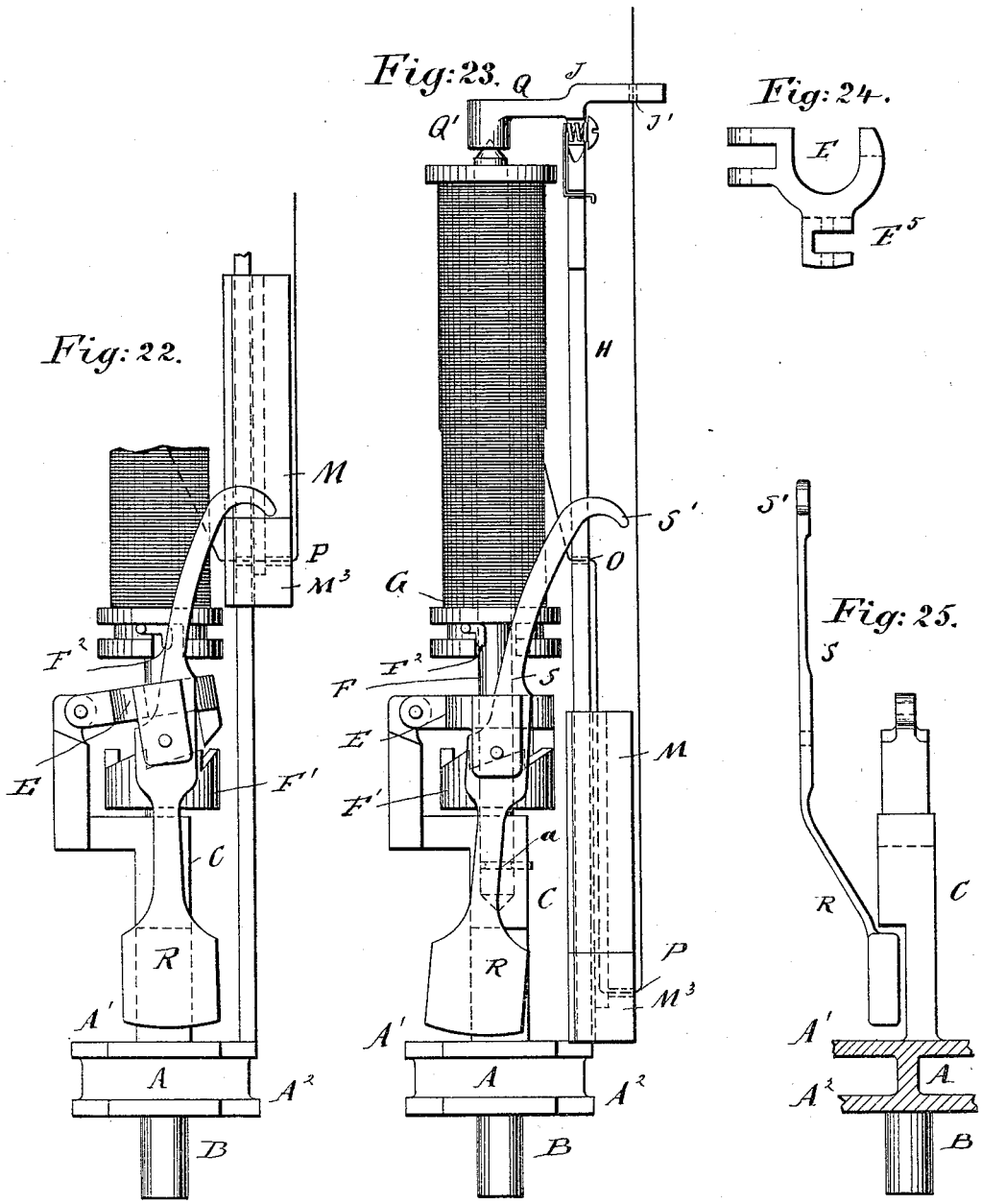
WITNESSES:
INVENTOR
W. Mundt
BY Goepel & Raegener
ATTORNEYS.

UNITED STATES PATENT OFFICE.

WILHELM MUNDT, OF NEW YORK, N. Y., ASSIGNOR TO LAURA MUNDT, OF SAME PLACE.

SPOOL-HOLDER FOR BRAIDING-MACHINES.

SPECIFICATION forming part of Letters Patent No. 520,655, dated May 29, 1894.

Application filed December 26, 1893. Serial No. 494,740. (No model.)

*To all whom it may concern:*

Be it known that I, WILHELM MUNDT, a citizen of the United States, and a resident of the city of New York, in the county of New York and State of New York, have invented certain new and useful Improvements in Spool-Holders for Braiding-Machines, of which the following is a specification.

This invention relates to certain new and useful improvements in spool-holders for braiding machines; and the object of my invention is to provide a spool-holder in which the spool is held with a minimum of friction, and in such a manner that the spool can readily be applied on the holder or removed from the same, by means of which holder the thread is guided in such a manner as to be held at a uniform tension throughout, and which spool-holder can be adjusted for use with the finest or coarsest yarn or thread as may be desired.

Figure 1:
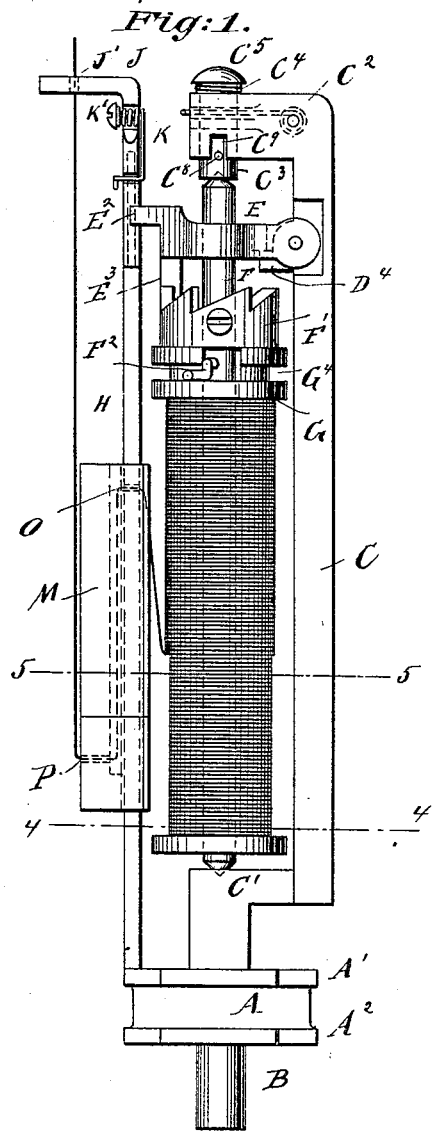
Figure 2:
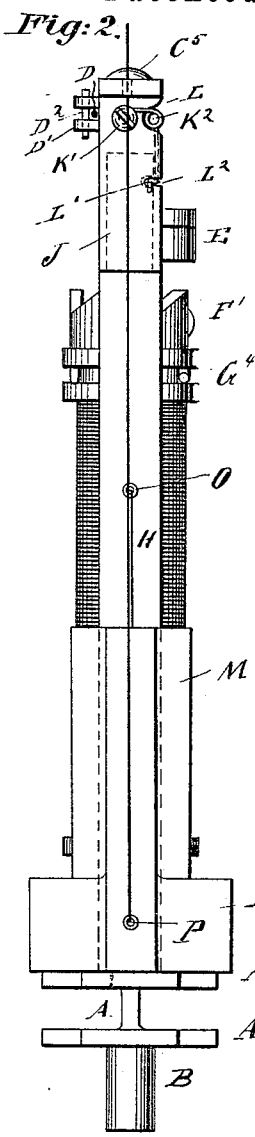
Figure 3:
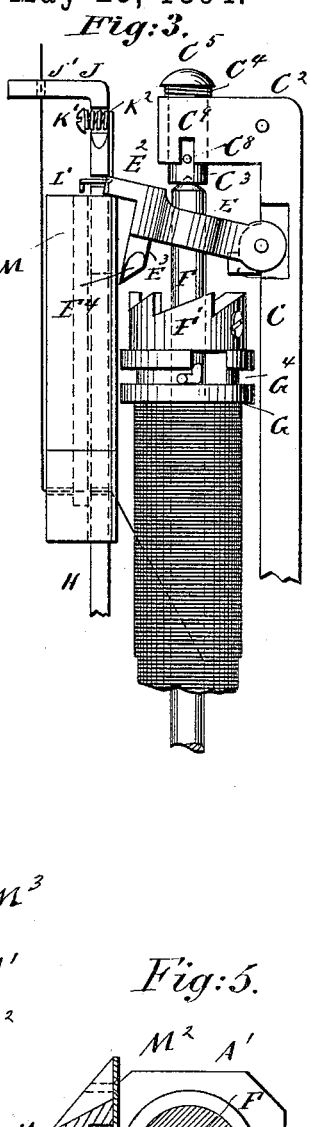
Figure 4:
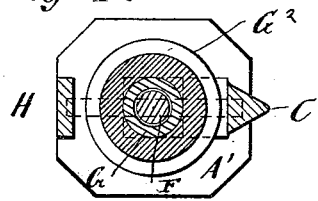
Figure 5:
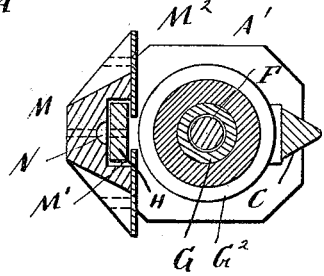

In the accompanying drawings,—Figure 1 is a side-view of my improved spool-holder for braiding machines. Fig. 2 is an edge view of the same. Fig. 3 is a side-view of the upper part, showing the parts in different positions. Fig. 4 is a horizontal sectional view, on the line 4—4, of Fig. 1. Fig. 5 is a horizontal sectional view, on the line 5—5, of Fig. 1. Fig. 6 is a detail side-view of the upper end of the standard, and the spring plug in the same. Fig. 7 is a horizontal sectional view of the same, on the line 7—7, Fig. 6, the spring being omitted. Fig. 8 is a front-view of the detachable thread-guide. Fig. 9 is a longitudinal sectional view of the same, on the line 9—9, of Fig. 8. Fig. 10 is a horizontal sectional view, on the line 10—10, looking upward. Fig. 11 is a detail side-view of the spindle, parts being broken out. Fig. 12 is a plan-view of the same. Fig. 13 is a side-view, and Fig. 14 an edge-view of the upper end of the vertical guide for the tension weight. Fig. 15 is a vertical longitudinal sectional view of the spool, parts being broken out. Fig. 16 is a plan-view of the same. Fig. 17 is a plan-view of the pawl-lever. Fig. 18 is a side-view of the same. Fig. 19 is a side-view of the spring-step in the top of the standard, parts being broken out and others in section. Fig. 20 is a face-view of the same. Fig. 21 is a horizontal sectional view of the same, on the line 21, 21, Fig. 19. Fig. 22 is a side-view of a modified construction of my improved spool-holder, parts being broken out. Fig. 23 is a side-view of the complete spool-holder of modified construction, and parts being shown in different positions from those shown in Fig. 22. Fig. 24 is a plan-view of the pawl-lever, and Fig. 25 is a detail side-view of the weight and tripping lever for the pawl-lever, the base of the spool-holder being in section.

Similar letters of reference indicate corresponding parts.

The spool-holder is supported on the base A having the top and bottom plates A' A², which serve to guide the spool-holder in the curved grooves of the base-plate of a braiding machine, and said base A is provided with the downwardly-projecting stem B, on which a cog-wheel of the usual construction is fixed for rotating the spool-holder. On the base of the holder the standard C is secured, which is provided near the bottom with the angle or offset C' in the top of which a step-bearing is formed for the lower end of the spindle, which lower end of the spindle is shaped conical, for the purpose of reducing friction to a minimum. The upper end of the standard C is provided with the laterally projecting arm C², in which the plug C³, is mounted to slide up and down, which plug is pressed upward by a helical spring C⁴ coiled around it between the top of the arm C² and the head C⁵ on the top of said plug. The plug is provided in its lower end with a conical aperture C⁶ forming a bearing for the upper conical end of a spindle. A transverse step pin C⁸ is passed through the plug a short distance above the lower end of the same, which step-pin prevents the plug from turning, and when said plug is raised passes into the notches C⁹ in the bottom edges of the arm C². The plug is provided a short distance below its head with a transverse groove C⁷ in its side, into which groove a spring D can snap, which is secured to the side of the arm C² and has its free end projecting beyond the end of the arm and which spring is guided between two laterally projecting lugs D' on the arm C², through which lugs a pin D² is passed to prevent pulling the free end of said spring D outward too far.

As shown in Fig. 7, the plug C³ is mounted in the arm C² in such a manner that part of the same projects outward beyond the plane of the side of the arm C² at that part of said arm where the lugs D' project. When the free end of the spring D is pulled outward the plug C³ is released and the helical spring C⁴ throws it upward, as shown in Fig. 6. After the spindle (to be described hereinafter) has been inserted, the plug C³ is pushed downward and when the groove C⁷ of said plug arrives at the spring D the same snaps into the groove, thus locking the plug in lower position.

A short distance below the arm C² the forked end E' of a curved pawl-lever E is pivoted to a lug D³ of the standard, below which lug a projection D⁴ is formed on the standard to prevent said lever E from descending lower than the horizontal position. Said lever E is provided on its free end with a nose E² and with a downwardly-projecting arm E³ having its end beveled, as shown at E⁴. This lever E, which will be designated hereinafter as the pawl-lever, serves to engage a ratchet crown-wheel F' fixed on a spindle F a short distance below the upper end of the same. Said spindle F is provided a short distance below the crown-ratchet-wheel F' with the transverse rod F², having its ends F³ made L-shaped for a purpose that will be set forth hereinafter. The spool G is provided with the usual longitudinal central bore G', the bottom head G² and the top head G³ of greater thickness. The top head G³ is provided with a circumferential groove G⁴ and with a transverse groove G⁵ in the upper surface of said top-head, which transverse groove extends down to the bottom of the circumferential groove G⁴. At the side of the standard C and a distance from the same sufficient to permit of inserting the spindle and spool, the weight-guide H projects upward from the base, which weight-guide H has its upper end H' slightly reduced in width and thickness and is provided in one edge of said reduced part a short distance from the top, with the notch H². A thread-guiding arm J, preferably made rectangular in shape, is provided in the laterally-projecting part with an eye J' for guiding the thread and in its vertical part with a longitudinal recess J² for receiving the upper reduced end H' of the weight guide H. A spring-wire K is fastened by a screw K' to the outer side of the vertical arm of the thread-guide J and is bent to form a loop K² within a notch L in one edge of the vertical part of the thread-guide, and the lower end of said wire is bent to form a catch L', which rests in the notch L² in the side-edge of the vertical part of the thread-guide. When the thread-guide is placed on the upper reduced end of the thread-guide H the spring-catch L' snaps into the notch H² in the side-edge of the reduced part H' of said weight-guide, thereby locking the thread-guide on the upper end of the weight-guide. To remove the thread-guide, all that is necessary is to draw the catch L' out of the notch H² in the upper part of the weight-guide.

The sliding-weight M is provided in its inner surface with a longitudinal groove M' for receiving the guide H, and to the inner face of said weight plates M² are riveted, the edges of which lap over on the inner side of the guide H for the purpose of holding and guiding said weight on the guide H. The weight is provided near its lower end with the laterally-projecting wings M³ for the purpose of increasing the body of the weight without increasing the length or thickness of the same. A longitudinal groove N is formed in the base of the groove M' to permit the thread to pass. A thread-guiding aperture or eye O is formed in the guide H at about half the height of the same and a thread-guiding aperture or eye P is formed in the lower end of the weight. The thickness or width of the weight transversely to the guide H is such that the outer end of the guide-eye P in the bottom of the weight M is vertically below the eye J' in the thread-guide J, as shown, for example, in Figs. 1 and 3.

In the construction shown in Figs. 22 to 25 the plug C³ is dispensed with and the thread-guide J is provided with an arm Q provided in its under side with the socket Q' for the upper end of the spindle. The ratchet crown-wheel F' is applied on the lower part of the spindle and the cross-rod F² is arranged above said ratchet crown-wheel. The step-bearing for the lower end of the spindle is made a greater depth, so as to assist in holding the spindle in vertical position, and said spindle is locked in place by means of a wire, parts of which enter an annular groove a in the lower part of the spindle. The pawl-lever E is weighted by means of a weight R pivoted to lugs E⁵ of said pawl-lever, which weight is provided with an upwardly projecting curved arm S, the upper hook-end S' of which is in the path of the lugs M³ of the weight, so that when said weight M passes upward it can engage said hook S' and pull the same, with the weight R and pawl-lever E, upward into the position shown in Fig. 22.

The operation is as follows:—The thread-guide J is detached from the upper end of the weight-guide H and a weight M is placed on said guide H, that is appropriate for the quality and weight of the thread on the spool. The thread-guide J is then replaced and locked on the upper end of the guide H by means of its spring-catch L'; the spindle F is passed through the bore G' of the spool G until the cross-rod F² passes into the transverse groove G⁵ in the end of the spool, and then the spindle is turned axially a short distance to cause the L-shaped ends of the cross-rod F² to pass into the circumferential groove G⁴, whereby the spool is securely locked on the spindle. The lower end of the spindle is placed on the step-bearing forming on the standard C and the upper end is held directly below the plug C³, which has been raised by its spring C⁴. The plug is then pressed down upon the conical upper end of the spindle and is locked in place by the spring D, which snaps into the notch C⁷ of said plug. The pawl-arm E³ rests on the teeth of the ratchet crown-wheel F'. The thread from the spool is passed through the guide-eyes O, P, and J', as shown in Fig. 1, and connected with the braiding mechanism. As the braiding mechanism uses up the length of thread drawn from the spool the weight M slides up and down on its guide H, keeping the thread at a uniform tension. As the thread is consumed the weight M is gradually raised higher and higher until finally it is in such position that it strikes the nose E² on the end of the pawl-lever E and raises said pawl-lever, so as to disengage the pawl-arm E³ from the ratchet crown-wheel F'. The tension on the thread is sufficient to give the spool a sudden whirl, whereby a certain quantity of thread is unwound from the spool. This unwinding of the thread immediately slackens the thread and permits the weight M to drop and the pawl-lever E drops immediately, whereby the spool is locked in place by the engagement of the pawl-arm E³ with the ratchet crown-wheel F'. The thread that has been unwound by the sudden whirl of the spool is consumed by the braiding machine, the weight M sliding up and down as the thread is consumed, and when the weight is again raised to such an extent as to lift off the pawl-lever E from the ratchet crown-wheel F another length of thread is unwound, and so on. As the ends of the spindle are made conical and work in conical bearings, the friction is reduced to a minimum, and thus the slightest strain on the thread is sufficient to unwind the desired quantity. As the end of the eye P at which the thread leaves the weight is vertically below the guide-eye J' the weight is only subjected to strains in the direction of its length and there is no possibility of the weight binding on its guide and thereby causing undue strain to the thread. It will be noticed that throughout the thread passes vertically, with the exception of the part that passes from the spool to the guide-eye O, in which part, however, there is no heavy strain. As the spool does not turn on its spindle there is no danger of the thread breaking on account of the resistance offered by the spool. When the spool is to be removed, all that is necessary is to pull the spring D outward, when the spring C⁴ immediately throws up the plug C³, permitting the removal of the spindle with the spool. The spindle is then turned and then pulled outward, when a fresh spool can easily be placed on the spindle. To change the weight according to the thread used, all that is necessary is to disengage the thread-guide from the upper end of the guide H and remove it, when the weight H can easily be slipped off and replaced by another. The device shown in Figs. 22 to 25 operates in substantially the same manner. When the thread is consumed the weight M is raised so high that its lateral wings M³ strike against the upper end S' of the lever S, whereby said lever with the pawl-lever E is raised and the ratchet crown-wheel F' on the spindle is released, permitting the tension on the thread to give the spool a whirl sufficient to unwind the desired quantity of thread, the thread immediately becomes slack, the weight M descends, the weight R draws down the pawl-lever, which immediately engages the ratchet crown-wheel F', whereby the spindle is locked in place until the quantity of thread unwound has been consumed, when the weight M again rises, lifts the pawl-lever and permits the spool to be rotated.

The advantages of my improved spool-holder are that the thread is not subjected to any undue strain, and has a uniform tension throughout thus permitting of using my spool-holder with the finest threads without any danger of rupturing them, and which cannot be worked with the spool-holders used heretofore. The friction is reduced to a minimum, as I do not rotate the spool on the spindle, as has been customary heretofore and whereby a large friction surface was obtained; and furthermore, my improved spool-holder can readily be adjusted for the different kinds of threads, the spool can easily be placed into the holder, and it permits of the ready and rapid unwinding of the thread, which is necessary for threads of the kind for which this holder is designed.

Having thus described my invention, I claim as new and desire to secure by Letters Patent—

1. In a spool-holder the combination with a base, of a standard on the same, which standard has a step, a tension-weight guide projecting upward from the base at the side of the standard, a tension weight mounted to slide on said guide, a spool-holding spindle mounted to turn on the step of the standard, and a spring-plug in the top of the standard and forming a bearing for the upper end of the spindle, substantially as set forth.

2. In a spool-holder, the combination with a base, of a standard having a step and a laterally-projecting arm at the upper end, a tension weight guide projecting upward from the base at the side of the standard, a tension weight mounted to slide on said guide, a spring-plug in the laterally-projecting arm at the upper end of the standard, which spring-plug forms the bearing for the upper end of the spindle, the lower end of the spindle resting on the steps of the bearing, substantially as set forth.

3. In a spool-holder, the combination with a base, of a standard projecting upward from the same and forming a step for one end of a rotating spool-holding spindle, a vertically sliding plug in the top of the standard, a spring for pressing said plug upward, and a latch for locking the plug in the lower position, substantially as set forth.

4. In a spool-holder, the combination with a base, of a standard projecting upward from the same and forming a step-bearing for the lower end of a rotating spool-holding spindle, a sliding plug in the top of the standard, a spring for pressing said plug upward, a spring-latch held on the side of the upper part of the standard for locking the plug in the lower position, two lugs on the side of the standard between which lugs the spring-latch is guided and its stop-pin passed through the outer ends of said lugs, substantially as set forth.

5. In a spool-holder, the combination with a base, of a standard on the same, a spool-holding spindle mounted to turn on said standard, a pawl-lever pivoted on the standard, a ratchet-wheel on the spindle which ratchet-wheel can be engaged by the pawl-lever, a cross-rod on the spindle below the ratchet-wheel, which cross-rod can pass into a groove in the end of a spool that is placed on the spindle, a weight-guide projecting upward from the base, and a weight sliding on said guide, which weight can raise the pawl-lever, substantially as set forth.

6. In a spool-holder, the combination with a base, of a standard on the same, bearings for a rotating spool-holding spindle on said standard, a weight-guide projecting upward from the base, a detachable thread-guide on the upper end of the weight-guide, and a spring catch on said thread-guide for locking the same on the upper end of the weight-guide, and a weight sliding on said guide, substantially as set forth.

In testimony that I claim the foregoing as my invention I have signed my name in presence of two subscribing witnesses.

WILHELM MUNDT.

Witnesses:
OSCAR F. GUNZ,
K. R. BRENNAN.